Sept. 23, 1924.
B. NOLL
1,509,607
TRUCK BODY
Filed June 22, 1923　　2 Sheets-Sheet 1
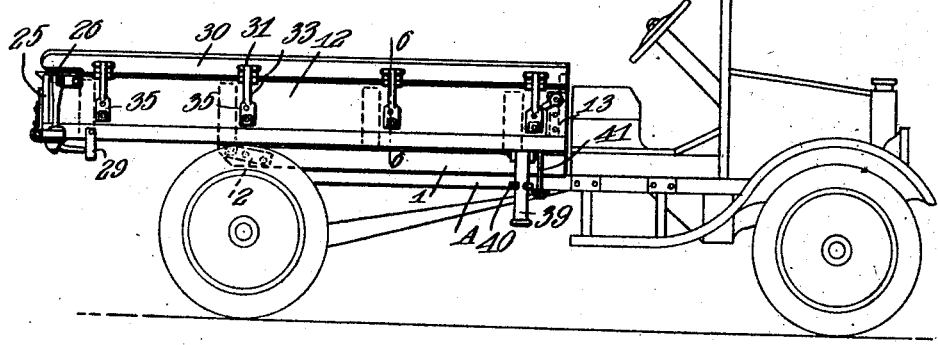
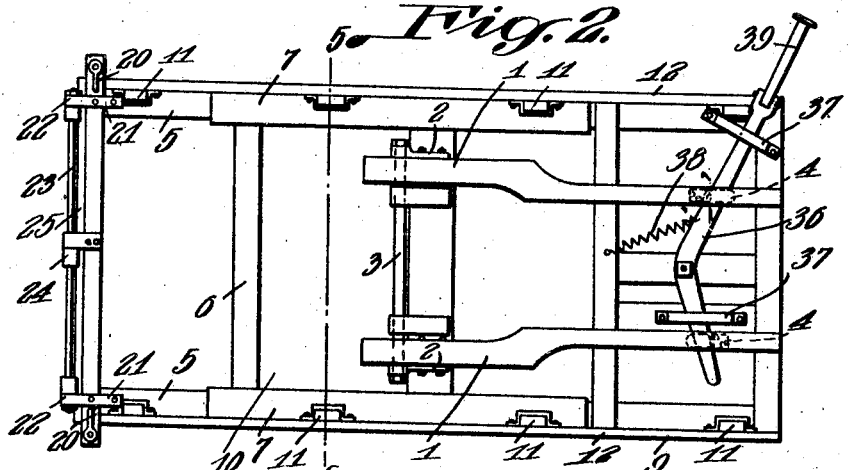
B. Noll, Inventor

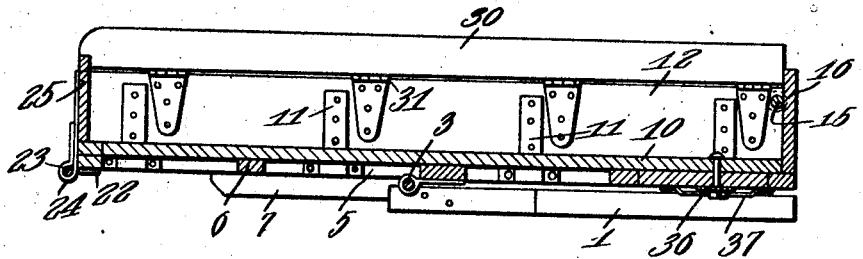

Patented Sept. 23, 1924.

1,509,607

UNITED STATES PATENT OFFICE.

BERT NOLL, OF SISTERSVILLE, WEST VIRGINIA.

TRUCK BODY.

Application filed June 22, 1923. Serial No. 647,108.

*To all whom it may concern:*

Be it known that I, BERT NOLL, a citizen of the United States, residing at Sistersville, in the county of Tyler and State of West Virginia, have invented a new and useful Truck Body, of which the following is a specification.

This invention relates to truck bodies and while the improvements are designed particularly for use in connection with automobile trucks it is to be understood that they can be combined also with railway cars and other vehicles.

One of the objects of the invention is to provide a truck body having a novel connection with the chassis or supporting frame, there being simple and efficient means for fastening the body so as to hold it against tilting relative to the supporting frame.

Another object is to provide a vehicle body the side boards of which can be removed readily, and when in place, will be held securely.

A further object is to provide the side boards of the body with flare boards that can be adjusted for use as seats whereby passengers can be carried.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is a side elevation of an automobile truck having the present improvements combined therewith.

Fig. 2 is a bottom plan view of the body complete and ready for attachment to a chassis.

Fig. 3 is a rear elevation.

Fig. 4 is a central longitudinal section.

Fig. 5 is a transverse section on line 5—5 Fig. 2.

Fig. 6 is a section on line 6—6 Fig. 1.

Fig. 7 is a section showing the front fastening means of one of the side boards.

Fig. 8 is a section through the depending releasing handle and showing the holding strips in bottom plan.

Fig. 9 is a detail view of one of the keepers of the locking lever.

Referring to the figures by characters of reference 1 designates spaced beams adapted to be secured in any suitable manner upon the side portions of the chassis of a motor vehicle, said chassis being shown, in the present instance at A. Secured to the rear portions of these beams are bearing brackets 2 in which is secured a pivot rod 3. Oppositely extended keepers 4 are secured on the upper faces of the front portions of the beams 1.

The body includes a frame made up of side members 5 connected by cross members 6, and as shown in Figs. 4 and 5, the side members can be reinforced by additional members 7. The members 5 and 7 are notched or recessed at 8 and secured to the outer sides of these members are face strips 9 bridging the recesses. These strips are fixedly connected to the side members in any suitable manner. The floor 10 of the body is secured to the members 5 and the cross strips 6, the side and front edges thereof terminating inwardly from the corresponding edges of the frame of the bottom.

The recesses 8 are adapted to receive standards 11 fixedly connected to and extending downwardly from the side boards 12. These side boards are adapted to rest on the strips 9 close to the side edges of the bottom 10 and they are provided, at their front ends, with inturned retaining plates 13 adapted to lap and engage the front board 14 of the body. This front board is designed to rest on the front end of the frame close to and in front of the body and the side boards are clamped to the ends of the front board by a cross rod 15 having a head 16 at one end while its other end is engaged by the tail nut 17. Secured to the outer sides of the side boards 12 are downwardly curved arms 18 the lower ends of which are extended through laterally projecting brackets 19 formed by the end of the rear cross member 6 of the bottom frame. These arms may be secured in these brackets in any suitable manner, as by means of tail nuts 20. Obviously by unscrewing the tail nuts 17 and 20 the side boards can be removed quickly from the bottom of the body.

Brackets 21 having terminal eyes 22 are secured to the rear end of the frame of the bottom and extending through the eyes is a pivot rod 23. This rod is engaged by the lever ends of hinge members 24 secured to and extending downwardly from the tail gate 25 of the body. This gate is held normally closed by spring latches 26 secured to the rear end side board 12 and adapted to snap into engagement with the upper edge of the tail gate when the gate is closed. An additional spring catch 27 extends downwardly from the side of the bottom frame and is adapted to engage the gate 25 when it is swung downwardly to position under the body. Thus the gate will be held out of the way when the rear end of the body is lowered during the dumping operation.

Flare boards 30 are hingedly connected to the upper edges of the side boards 12 as shown at 31 and secured to these flare boards are transverse strips 32 to which are hingedly connected braces 33. Bolts 34 are extended through the side boards 12 and each of the braces 33 is provided at its lower end with spaced openings 35 either of which is adapted to receive a bolt. When the lower openings are positioned to receive the bolts the flare boards 30 are supported in laterally and upwardly inclined positions as shown in the drawings. By lowering the braces 33 so that the bolts 34 can be inserted through the upper openings 35 the flare boards 30 will be brought to substantially horizontal positions whereupon they can be used as seats for passengers.

Pivotally connected to the frame of the bottom of the body close to the front end thereof is a bell crank 36, the arms of which extend between the bottom of the body and the beam 1. One arm of this bell crank is adapted normally to engage one of the keepers 4 while the other arm normally engages the other keeper. Both arms are slidably mounted upon guide strips 37 secured to the bottom of the body and serving to hold the bell crank firmly to the body. A spring 38 connects the bell crank to the body and acts to hold the same normally in engagement with the keepers. A handle 39 is pivotally connected to one of the arms of the bell crank and normally hangs downwardly at which time it engages a spring clip 40 extending from one side of the chassis A and secured thereto in any manner desired.

It will be obvious that as long as the bell crank is in engagement with the keepers 4 the body cannot dump. By swinging the handle 39 into alinement with one arm of the bell crank and using it as a lever, said bell crank can be shifted against the action of spring 38 so as to become disengaged from the keepers 4. Thus the body can be tilted to dump its contents. It is necessary, of course, to disengage the tail gate 25 from the latches 26 before dumping the body and it is preferable to place the released tail gate in engagement with the latch 29.

The entire structure is complete in itself and can be applied readily to a supporting frame, such as a chassis A, any suitable means being provided for holding it in position. In the drawings U-bolts 41 have been provided for this purpose.

What is claimed is:—

1. The combination with spaced beams for attachment to a supporting structure, of a body bottom hingedly connected to the beams, a bell crank carried by the bottom, keepers carried by the beam for engagement by the respective arms of the bell crank, yielding means connected to the bottom for holding the bell crank normally in engaged position, a handle pivotally connected to one of the arms of the bell crank, and means for holding the handle in depending position when the bottom is secured to the beams.

2. The combination with spaced beams for attachment to a supporting structure, of a body bottom hingedly connected to the beams, a lever carried by the bottom, keepers carried by the beams for engagement by the lever, yielding means for holding the lever normally in engaged position, and cooperating means upon the lever and body for holding the lever against movement relative to the body, a handle pivotally connected to one end of the lever, and means for holding the handle in depending position when the bottom is secured to the beams by the lever and keepers.

In testimony that I claim the foregoing as my own, I have hereto affixed my signature in the presence of two witnesses.

BERT NOLL.

Witnesses:
 DANA S. MARSH,
 W. G. MAXWELL.